US010316541B2

(12) United States Patent
Attema (10) Patent No.: US 10,316,541 B2
(45) Date of Patent: Jun. 11, 2019

(54) ARTICULATING DWELLING FRAME

(71) Applicant: Daniel Andrew Attema, Soquel, CA (US)

(72) Inventor: Daniel Andrew Attema, Soquel, CA (US)

(*) Notice: Subject to any disclaimer, the term of this patent is extended or adjusted under 35 U.S.C. 154(b) by 0 days.

(21) Appl. No.: 15/783,486

(22) Filed: Oct. 13, 2017

(65) Prior Publication Data

US 2019/0112831 A1    Apr. 18, 2019

(51) Int. Cl.
*E04H 15/06* (2006.01)
*E04H 15/00* (2006.01)
*E04H 15/48* (2006.01)

(52) U.S. Cl.
CPC .......... *E04H 15/008* (2013.01); *E04H 15/06* (2013.01); *E04H 15/48* (2013.01)

(58) Field of Classification Search
CPC ........... B60P 3/38; E04H 15/06; E04H 15/008
USPC ............................................ 135/88.07, 88.14
See application file for complete search history.

(56) References Cited

U.S. PATENT DOCUMENTS

| | | | | |
|---|---|---|---|---|
| 3,010,462 A * | 11/1961 | Barber | | B60P 3/38 135/117 |
| 3,506,299 A * | 4/1970 | Arnold | | B60P 3/341 296/170 |
| 3,712,316 A * | 1/1973 | Leonard | | B60P 3/38 135/116 |
| 4,055,366 A * | 10/1977 | Lee | | B60P 3/38 135/87 |
| 4,058,133 A * | 11/1977 | Barr | | B60P 3/38 135/132 |
| 4,251,102 A * | 2/1981 | Lee | | B60P 3/38 135/88.16 |
| 4,548,438 A * | 10/1985 | Myers | | B60P 3/38 135/88.16 |
| 4,653,800 A * | 3/1987 | Myers | | B60P 3/38 135/88.16 |
| 5,544,671 A * | 8/1996 | Phillips | | B60P 3/341 135/150 |
| 9,222,278 B2 * | 12/2015 | Park | | E04H 15/06 |

* cited by examiner

*Primary Examiner* — Noah Chandler Hawk
(74) *Attorney, Agent, or Firm* — Donald R. Boys; Central Coast Patent Agency LLC (57) ABSTRACT

A mechanism for extending a floor while erecting a structure, has a linkage, including a first frame element constrained proximate and translatable relative to a second frame element, from a minimum retracted length to a maximum deployed length, a third frame element having a length, and joined at one end pivotally to the first elongate frame element at an end away from the second elongate frame element, and a link joined at one end pivotally to the second elongate frame element, and at an opposite end pivotally at a point along the length of the third frame element, such that retraction of the first frame element relative to the second frame element results in the third frame element lying at an angle that is less than the angle when the first frame element is fully deployed relative to the second frame element.

9 Claims, 10 Drawing Sheets

ARTICULATING DWELLING FRAME

BACKGROUND OF THE INVENTION

1. Field of the Invention

The present invention is in the field of mechanical frame structures and pertains particularly to methods and apparatus for creating a deployable and retractable personal environmental enclosure.

2. Discussion of the State of the Art

Mechanized mechanical framing generally includes any frame structure where at least a part of the frame structure is mechanized to form a feature of the structure, such as a platform, a wall, an extension span, or some other physical and useful trait or feature of the apparatus. Mechanical framing is used in home construction, recreational vehicle (RV) construction (Pop-Outs), and other types of construction framing. Personal enclosures like tents are available that use mechanical framing at least to some degree such as, for example, a pop-up tent trailer.

One problem with current art mechanical framing structure relative to a personal enclosure such as a tent, is that assembly of some amount is typically required to effect and erect the frame structure, and to apply appropriate covering, such as tent material to the structure defining the enclosure.

Therefore, what is clearly needed is a deployable and retractable personal enclosure that eliminates a requirement for previous or instant assembly of framing components and application of covering fabric for the enclosure.

BRIEF SUMMARY OF THE INVENTION

In one embodiment of the invention a mechanical mechanism for simultaneously extending a floor while erecting a structure is provided, comprising a mechanical linkage, comprising a first elongate frame element constrained proximate and translatable relative to a second elongate frame element, from a minimum retracted combined length to a maximum deployed combined length, a third elongate frame element having a length, and joined at one end pivotally to the first elongate frame element at an end away from the second elongate frame element, and a link joined at one end pivotally to the second elongate frame element, and at an opposite end pivotally at a point along the length of the third elongate frame element, such that retraction of the first elongate frame element relative to the second elongate frame element results in the third elongate frame element lying at an angle that is less than the angle when the first elongate frame element is fully deployed relative to the second elongate frame element.

In one embodiment the mechanism further comprises a fabric structure having a rectangular base about the width of the mechanical structure and a length about the maximum extended length of the mechanical linkage, and upper portions joined together to about the shape of the extended mechanical structure, the fabric structure constrained within the mechanical structure, and suspended from points at the ends of the third elongate frame element, such that the fabric structure is collapsed with the mechanical structure retracted, and deployed with the mechanical structure extended.

Also in one embodiment, the mechanism further comprises a bar pivoted at a point along a length of the link between the second and third elongate frame elements, constrained by cables of fixed length to an end of the third elongate frame elements and an end of the second elongate frame elements, the bar providing an additional shape to the deployed mechanical structure. In one embodiment the mechanism further comprises a fabric structure having a rectangular base about the width of the mechanical structure and a length about the maximum extended length of the mechanical linkage, and upper portions joined together to about the shape of the extended mechanical structure, including the bar, the fabric structure constrained within the mechanical structure, and suspended from points at the ends of the third elongate frame elements and the u-shaped bar, such that the fabric structure is collapsed with the mechanical structure retracted, and deployed with the mechanical structure extended.

In one embodiment, the third elongate frame element comprise a molded cover that covers and encloses all other elements of the mechanical structure in a retracted state. Also in one embodiment, the mechanism further comprises a mechanical interface enabling mounting the mechanical structure, including the fabric structure, to a top of a cab of a vehicle. Also in one embodiment, the mechanism may further comprise an interface enabling mounting of the mechanical structure, including the fabric structure, to a flat support. And in one embodiment the mechanism may further comprise a second mechanical linkage mirroring the first mechanical linkage, the two linkages spaced apart by cross members.

DETAILED DESCRIPTION OF THE INVENTION

In various embodiments described in enabling detail herein, the inventor provides a unique system for deploying and retracting a personal environmental enclosure. The present invention is described using the following examples, which may describe more than one relevant embodiment falling within the scope of the invention.

The inventor provides a unique extendable and retractable mechanized frame structure for framing a personal environmental enclosure. The present invention is described in enabling detail using the following examples, which may describe more than one relevant embodiment falling within the scope of the present invention.

Figure 1:
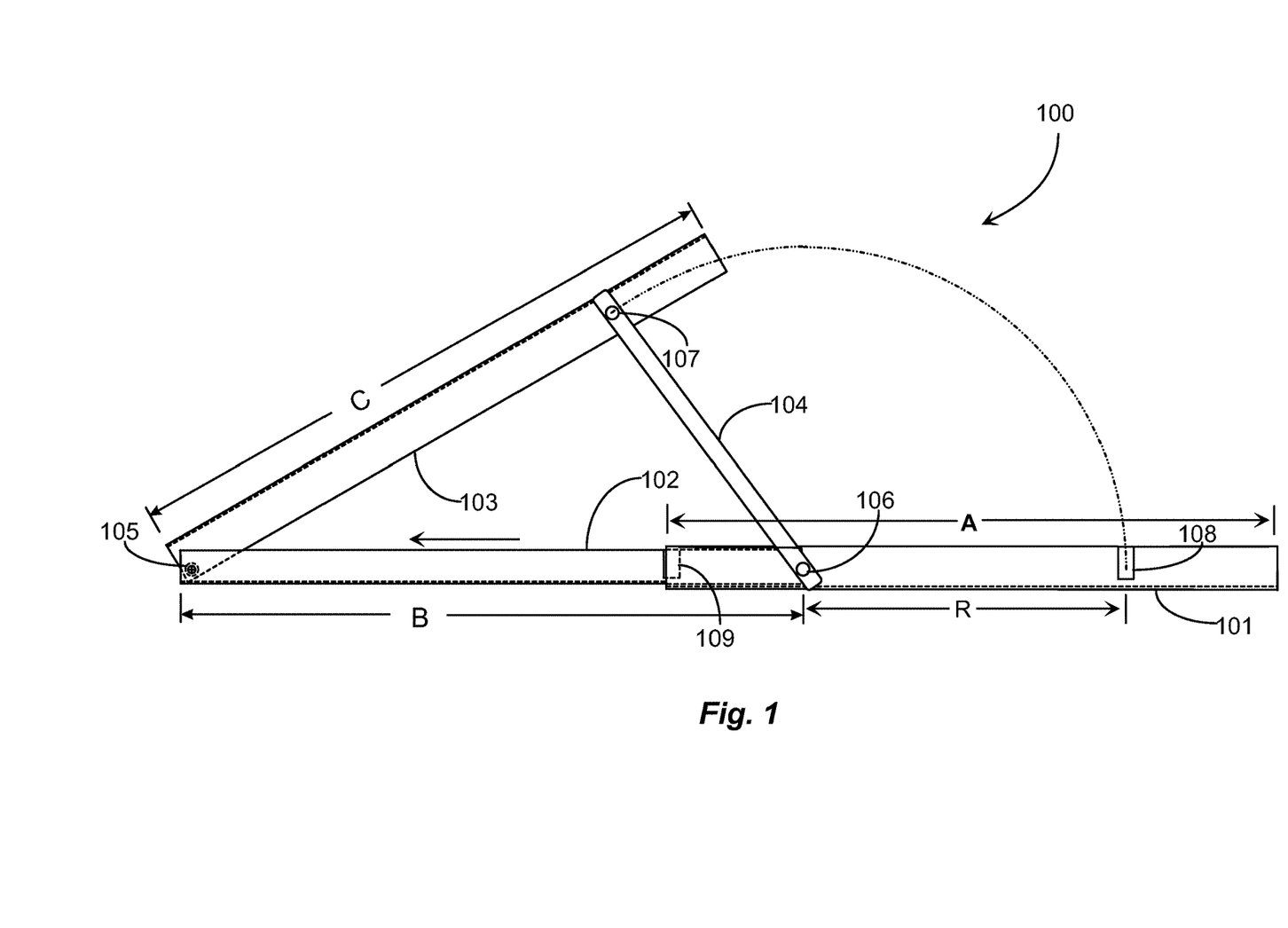
FIG. 1 is a side elevation view of a mechanized frame structure partially erected according to an embodiment of the present invention.

FIG. 1 is a side elevation view of a mechanized frame structure 100 partially extended according to an embodiment of the present invention. Frame structure 100 is adapted to be a portable and field-deployable framing structure that may be manipulated by hand or by powered mechanism to retract to a minimum volume, and to extend to raise a portion to a particular height.

Frame structure 100 includes two linear frame members 101 and 102, the linear frame members adapted to control the rest of the frame structure via linear translation relative to one another. In this particular implementation, linear member 101 is a rectangular piece having an overall length A, such as a section of rectangular channel having a bottom wall and vertical opposing walls, an open top and open at both ends. Linear member 101 may be fabricated from steel or aluminum extruded tubing, or it may be fabricated by forming a flat piece of sheet metal to form the sides. In other implementations, other durable materials might be substituted for steel or sheet metal such as a polymer molded form or rail.

Linear member 102 has an overall length, in this example B, which may, in some embodiments be the same length as A. But may vary considerably in other embodiments. Linear member 102 may be fabricated of rectangular tubing and may have the same general configuration described above relative to linear member 101, but need not be a channel. Member 102 may, in this embodiment, be a rectangular beam. The width of linear member 102 is just smaller than the inside width dimension of linear member 101, so that member 102 may fit within member 101, and may be urged to translate relative to linear member 101 by a user or by a mechanism operated by the user. In specific embodiments of the invention there may be ball bearings or journal bearing between members 101 and 102 to provide for easy translation and constraint.

With linear member 101 fixed in position, linear member 102 is, in various embodiments, a moveable component that is urged to translate within, or relative to, member 101. In various implementations, retainers, tracks, and or other machined or installed features may be provided along the inside of linear member 101 and along the outside of linear member 102 to enable linear member 102 to maintain a linear position within linear member 101, and to prevent member 102 from inadvertently coming out of the top or to prevent angular deviation from the plane of operation. Such features may include grooves, shelves, and retainer forms, stops, or blocks including a combination thereof.

In some embodiments, members 101 and 102 are not joined with one inside the other, but may be side-by-side, or one over the other. In some embodiments, member 102 is fixed and member 101 is movable. The important feature is that the two members are proximate and move relative to one another as described.

Mechanized frame 100 in this embodiment includes a third linear member 103 having an overall length, which, in some embodiments may be equal to A or B, and which may be similar in form and material, more particularly rectangular tubing. Linear member 103 may have an overall width that is just smaller than the inside width of linear member 102 and may fit into the open space of linear member 102, and may be urged to fit therein through an open top of member 102.

Linear member 103 is connected pivotally at one end to the inside of and near the end of linear member 102 away from member 101, at a pivot point 105a. Further, linear member 103 is pivotally connected to linear member 101 via a mechanical link 104. Mechanical link 104 is pivotally connected to linear member 101 via a pivot mount 106 on the vertical wall surface thereof and strategically disposed some distance from the interfacing end of linear member 101.

Link 104 is pivotally connected to linear member 103 on a vertical wall surface via a pivot point 107. Pivot points 106 and 107 control pivotal movement of linear member 103 about pivot points 105a via link 104 as a direct result of translating linear member 102 relative to linear member 101. Linear member 103 may pivot up from a retracted position substantially parallel to the horizontal plane of the sliding assembly, and may attain a maximum zenith in accordance with a strategic position along the linear path of the sliding assembly formed by components 101 and 102.

In some embodiments, pivot point 105 may be approximated by a multi bar linkage with additional control members that cause the linkage to operate as though there is a virtual pivot point at a particular position. Two additional control members, for example, might make a four-bar linkage to accomplish a virtual pivot point. Other multibar linkages with slider elements such as a scissor jack may be used to approximate pivot points 105a.

In this particular embodiment, linear member 101 includes a relief slot 108 implemented in a vertical wall (facing) and open at the top. Likewise, linear member 102 includes a similar relief slot 109 that may align with slot 108 when linear member 102 is urged completely into member 101. In this implementation, relief slots 108 and 109 align to accept the axle of pivot mount 107 in a retracted position, to enables a low profile and more convenient portability of the frame structure. A length R may generally be taken as the length between the centers of pivot mount axle 106 of link 104 and relief slot 108. R is a radius for the arc of articulation of link 104, and is the same dimension between the centers of the pivot mount axles. Furthermore, this mechanized frame structure may include further links and members and components that may be added to support further articulation based upon the sliding relationship between member 101 and member 102. Stops and lock switches may also be added to frame structure 100 without departing from the spirit and scope of the invention, in order to hold frame structure 100 in any desired position of articulation.

Figure 2:
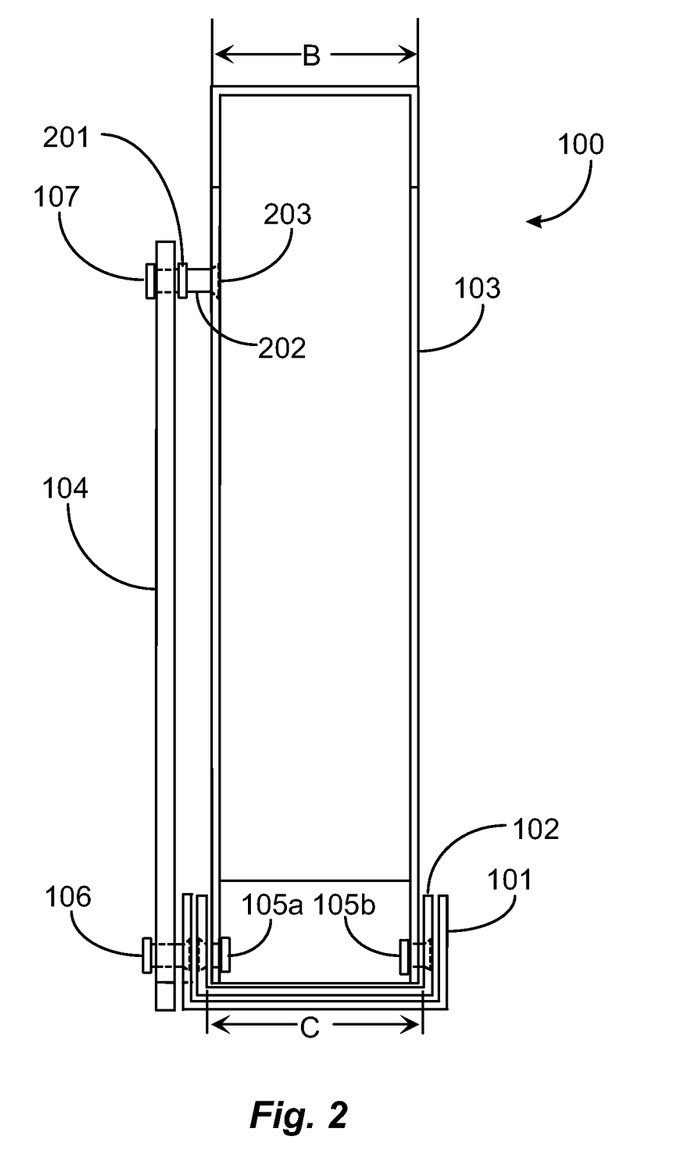
FIG. 2 is an end view of the mechanized frame structure of FIG. 1.

FIG. 2 is an end view of mechanized frame structure 100 of FIG. 1 viewed from the right, with the mechanism deployed as shown in FIG. 1. Linear member 101 is a surface-fixed or fixedly mounted component. Linear component 102 fits snugly into linear member 101, and linear member 103 fits snugly into linear member 102 when frame 100 is in a retracted state for stowing or non-use. Linear member 102 may be urged to translate back and forth within linear member 101. Linear member 103 is pivotally mounted at the end to linear member 102. Linear member 103 has an inverted position relative to linear members 101 and 102 and may rest within the inside width diameter of linear member 102 when frame 100 is in a retracted state as overall width dimension B of linear member 103 is just smaller than inside width dimension C of linear member 102.

Link 104 connects linear member 101 to linear member 103 via pivot mounts 106 and 107 as described above, with reference to FIG. 1.

Figure 3:
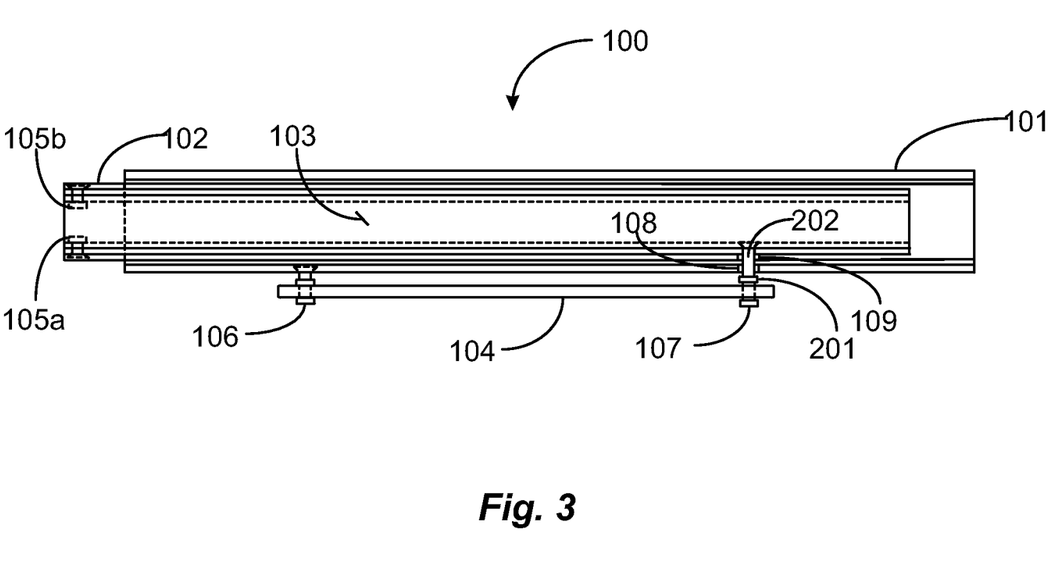
FIG. 3 is an overhead view of the mechanized frame of FIG. 1.

FIG. 3 is an overhead view of mechanized frame 100 of FIG. 1, depicted in a closed or retracted state. In this state linear member 103 nests within linear member 102, which in turn rests within linear member 101. In other implementations, other architectural arrangements might be provided with respect to how linear members 101, 102 and 103 may interact. For example, linear members 101 and 102 may be adjacent to one another or stacked on top of one another but remain parallel to one another where member 102 may be connected to member 101 in parallel and be enabled to move linearly and in parallel relative to the fixed position of member 101 without departing from the spirit and scope of the present invention. IN some embodiments the relative movement may not be exactly parallel.

Figure 4:
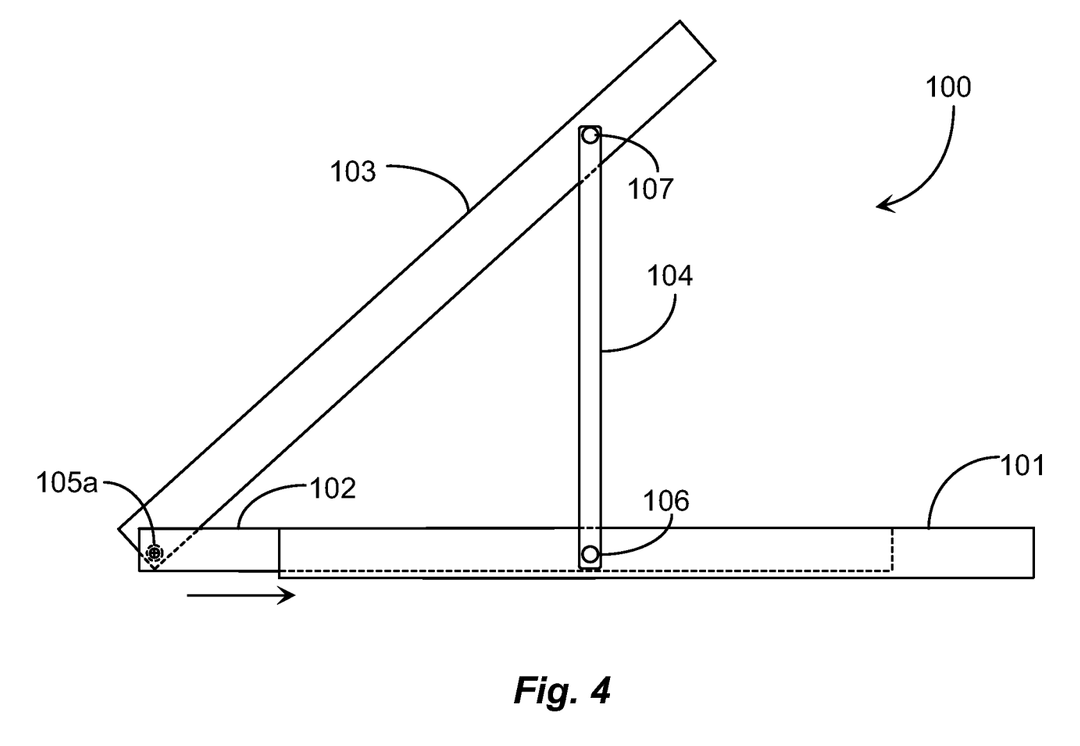
FIG. 4 is a side view of the mechanized frame structure of FIG. 1 fully erected.

FIG. 4 is a side view of mechanized frame structure 100 of FIG. 1 articulated to demonstrate maximum deployed height. This state occurs when link 104 is vertical.

Stops may be installed into the track system to prevent movement past a specific length of extension of linear member 102 out from liner member 101. Lock levers or switches may also be provided to secure a desired length of extension. In this position, linear member 103 assumes or attains a profile of approximately 45 degrees. The overall length of the frame structure may be adjusted. The desired length of extension, which governs the angle and reach of the articulated linear member 103 may be determined by a user or customized by the user.

Figure 5:
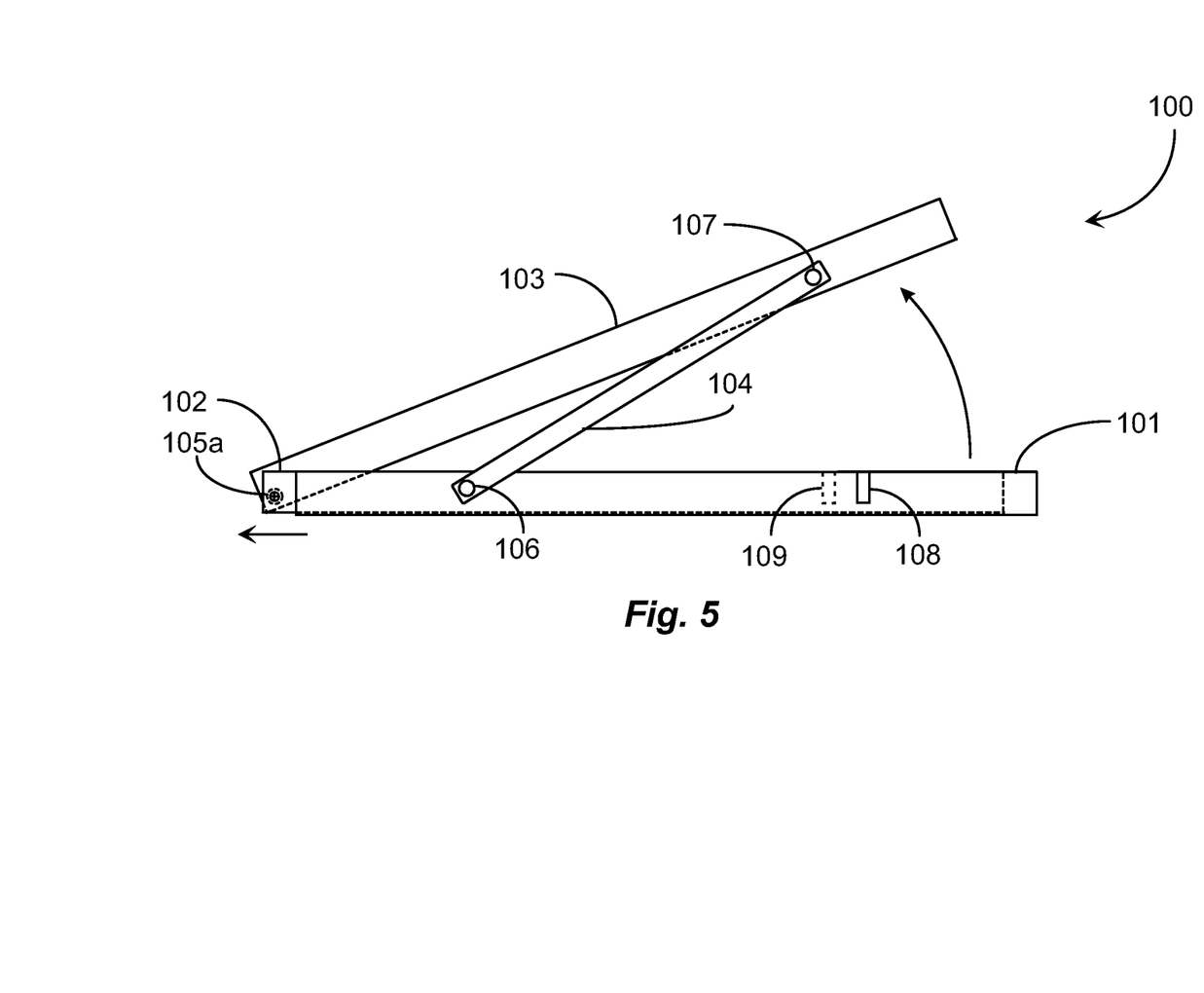
FIG. 5 is a side view of the mechanized frame structure of FIG. 1 mostly retracted.

FIG. 5 is a side view of mechanized frame structure 100 of FIG. 1 mostly retracted. In one implementation, frame 100 may be urged to a retracted state wherein linear member 103 is relaxed back downward to nest within linear member 102. In this example, relief slots 108 on linear member 101 and relief slot 109 on linear member 102 are nearly in alignment to accept pivot mount axle 107. In one implementation, a relaxed frame may be locked into the relaxed or nested state so that unintended articulation of linear member 103 may not occur during transport or while mounted but not in use.

Figure 6:
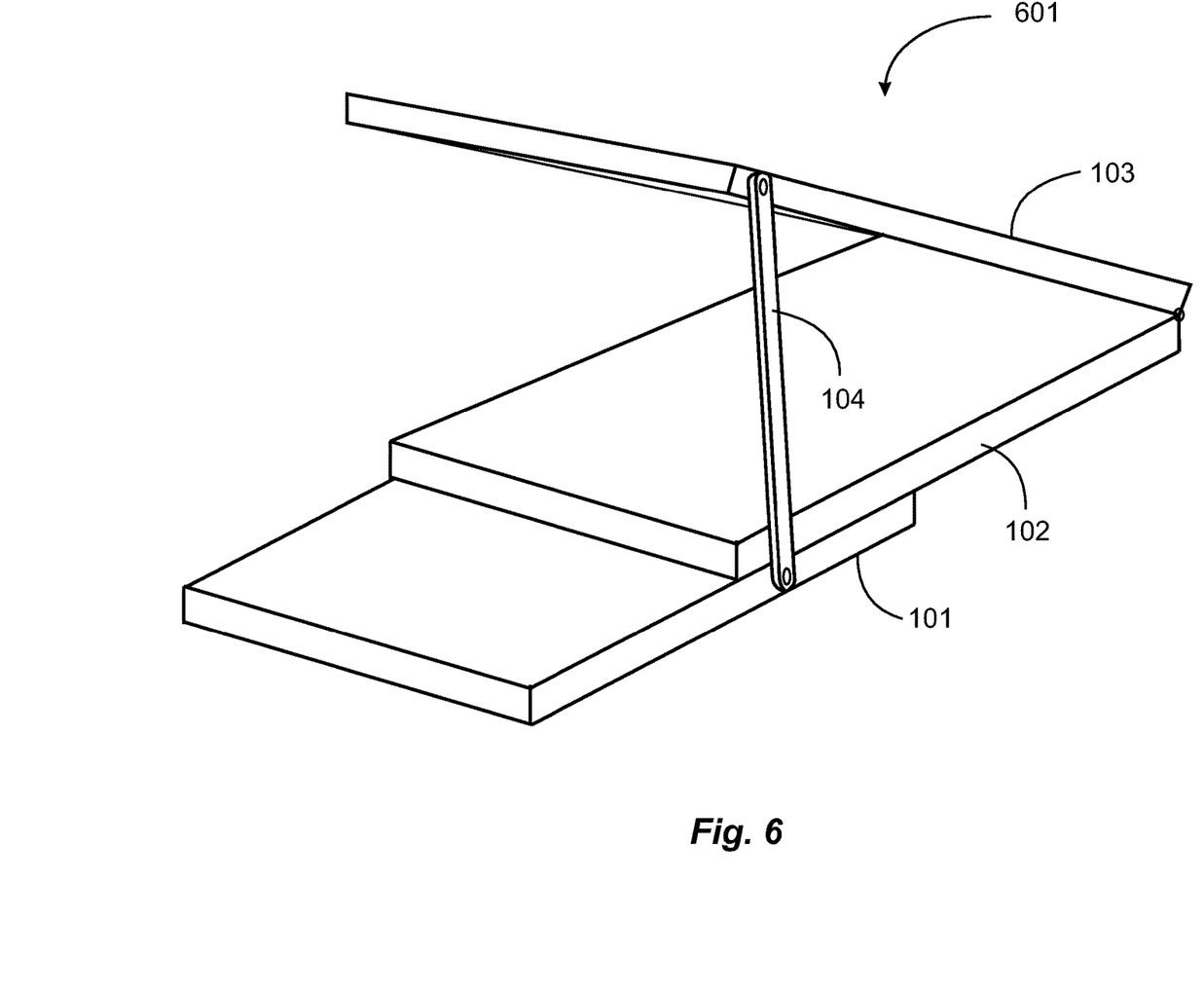
FIG. 6 is a perspective view of a frame structure based on a single linkage mechanism.

FIG. 6 is a perspective view of a mechanized frame structure based on the single linkage of FIG. 5, using the same element numbers as shown in FIG. 5, but having some differences in physical implementation. In the mechanism of FIG. 6, stationary element 101, and extensible element 102 are constrained my translation elements that cause them to translate in parallel, although parallel translation is not a strict limitation in the invention. Element 101 may be, for example, a floor element, and extensible element 102 may be a support for a bed or a mattress. Element 103 is a cover element that will serve as a part of an enclosure in extension, and is pivoted to link 104 near one end, which is also pivoted to element 101 as shown. Element 103 is hinged along one edge to element 102. As element 102 retracts relative to element 101, link 104 pivots counterclockwise, and element 103 closes over elements 101 and 102. As element 102 extends relative to element 101, link 104 causes element 103 to raise, providing at least a portion of an enclosure. In this embodiment, relief slots are not required.

Figure 7:
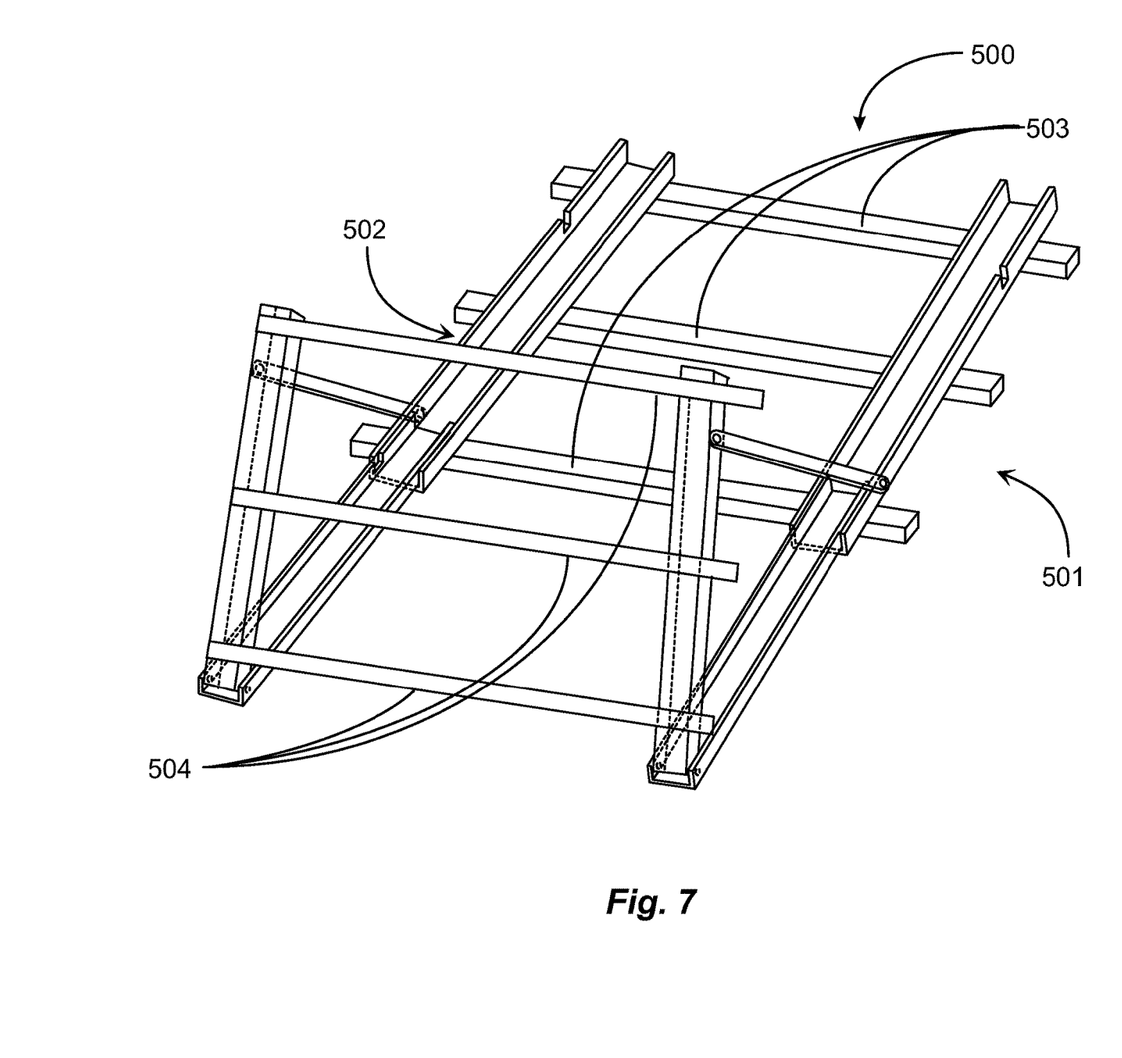
FIG. 7 is a perspective view of a mechanized frame structure reinforced with cross members according an embodiment of the present invention.

FIG. 7 is a perspective view of a mechanized compound frame structure 500, comprising two of the structures 100, joined and reinforced with cross members according an embodiment of the present invention. Frame structure 500 is an articulating structure consisting of two frame assemblies similar to, or identical to assembly 100 of FIG. 1, spaced apart to create a width suitable for a dwelling enclosure, fixed together using frame cross members 503 and 504 to connect the fixed base linear members in the same plane and parallel alignment, and to fix articulating linear members parallel to one another. In this implementation width of an ensuing enclosure is defined by the distance apart that the assemblies 100 are joined to form assembly 500.

Also in this implementation, mechanization or human manipulation may be provided to just one of the tandem frame assemblies in order to operate the articulating structure, or may be applied to both sides. Likewise locks and or stops may also be confined to one side of the structure or may be supplied on both sides of the structure. In an implementation of the present invention, the overall length A as referenced in FIG. 1 may be six feet or a similar length, to enable an enclosure that one may comfortably lie down in, such as on a mattress supported by the horizontal part of the structure. The cross members may also, in one embodiment, be adjustable in length to achieve a desirable width dimension for such as two persons comfortably laying side by side. In one implementation, the width of the structure may be preset and may not be adjustable.

Figure 8:
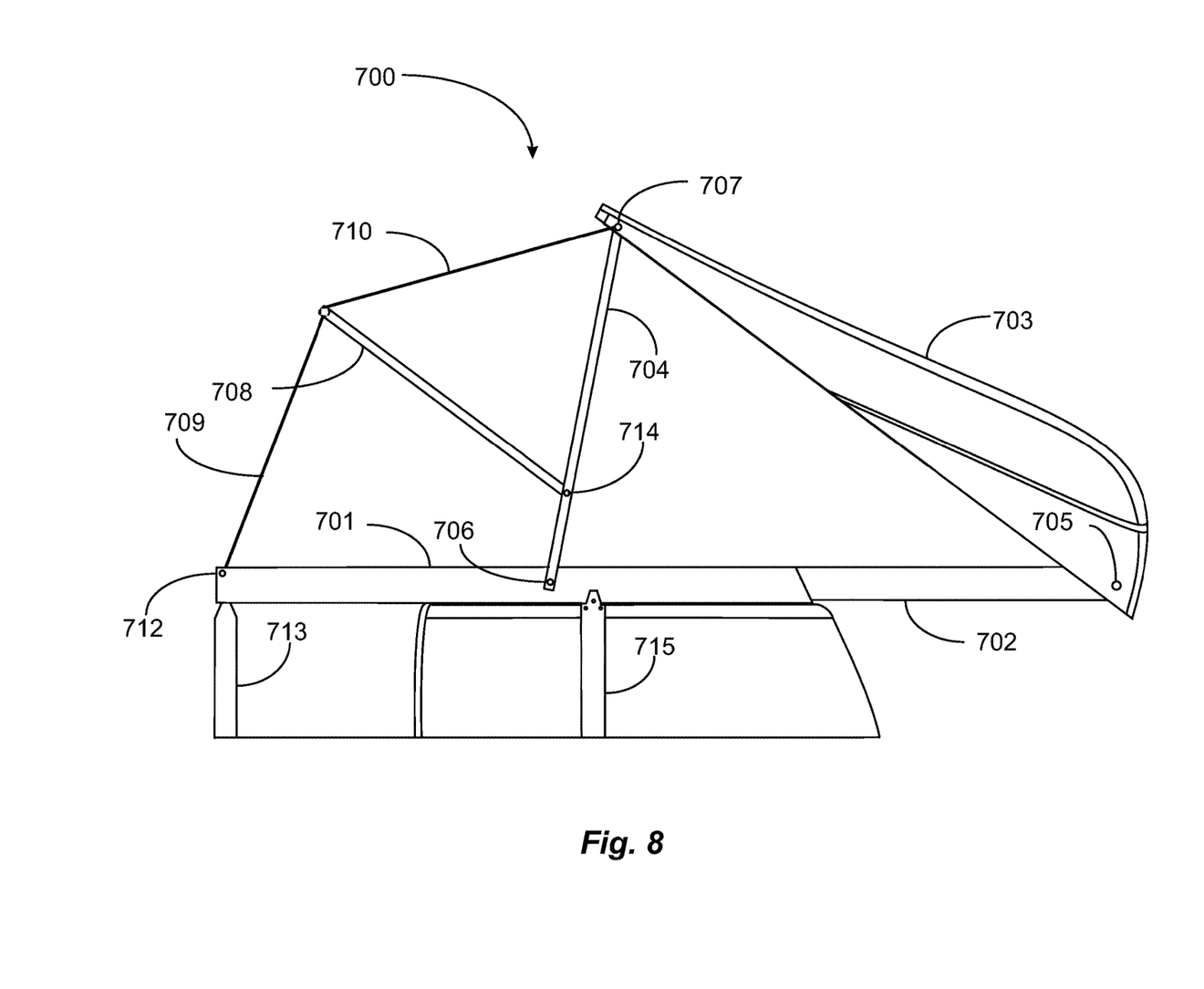
FIG. 8 is a side elevation view of a mechanized frame structure with an extension bar and cables for suspension of a tent according to an embodiment of the present invention.

FIG. 8 is a side elevation view of a mechanized frame structure 700, similar to that of FIG. 5, or of FIG. 6, with an additional extension bar 708, connected with cables 709 and 710, for suspension of a tent according to an embodiment of the present invention. Suspension structure 700 may be a single linkage structure, such as depicted in FIG. 6, or may include two side by side frame assembly components as depicted in FIG. 7. In the case of a side-by-side frame assembly, it should be noted that elements shown and labeled in FIG. 8 may be repeated on the opposite side of the apparatus (into the depth of the page).

Structure 700 may be mounted on a van or truck cab surface, a flatbed, or some other platform surface. In this view structure 700 is articulated and includes a hard cover 703, analogous to elements 103 in frame 100, articulated by a link 704, connected to the cover and to fixed linear member 701, analogous to member 101 of FIG. 1. Linear member 702 is extended out from member 701 to initiate the articulation of the overall frame as previously described.

Hard cover 703 may be manufactured or molded from a durable and weather resistant polymer or it may be a metallic cover. When the mechanized frame structure is in a retracted state, cover 703 folds down over other elements, and may serve to protect any items covered such as tent material, a mattress, or other cargo. Lever locks or latches (not illustrated) may be provided to secure cover 703 down against the retracted frame to prevent unintended articulation. Frame structure 700 further includes in one embodiment extension bar 708, mentioned above, that may in some cases be a u-shaped element mounted to links 704 at pivot points 714, and constrained by cables 709 and 710. In some embodiments, pivot points 714 may be located on linear member 701 or may be concentric with pivot point 706.

In this example, cable 709 may be provided to attach at one end to anchor point 712 at the non-interfacing end of linear member 701. Cable 710 may attach to a point 707 at an end of cover 703. Cables 709 and 710 may be attached at their second ends to anchor points provided on bar 708. Bar 708 may be, as described above, a U-bar that spans the width of the compound frame structure or may be two separate members.

In this example, frame structure 700 may be adapted to suspend a tent, not shown in this view. The cables function to raise bar 708 to a desired angular position from pivot point 714 during articulation of frame 700, resulting from extension of linear member 702 out from linear members 701. In one implementation, a tent may be provided to be suspended at four or more points from the articulated frame apparatus.

In some embodiments, apparatus 700 may be mounted to a truck bed or on top of a vehicle cab such as is depicted here. In this implementation, support posts 713 and 715 are visible on this side. Other supports may be used in other circumstances and embodiments of the invention.

Figure 9:
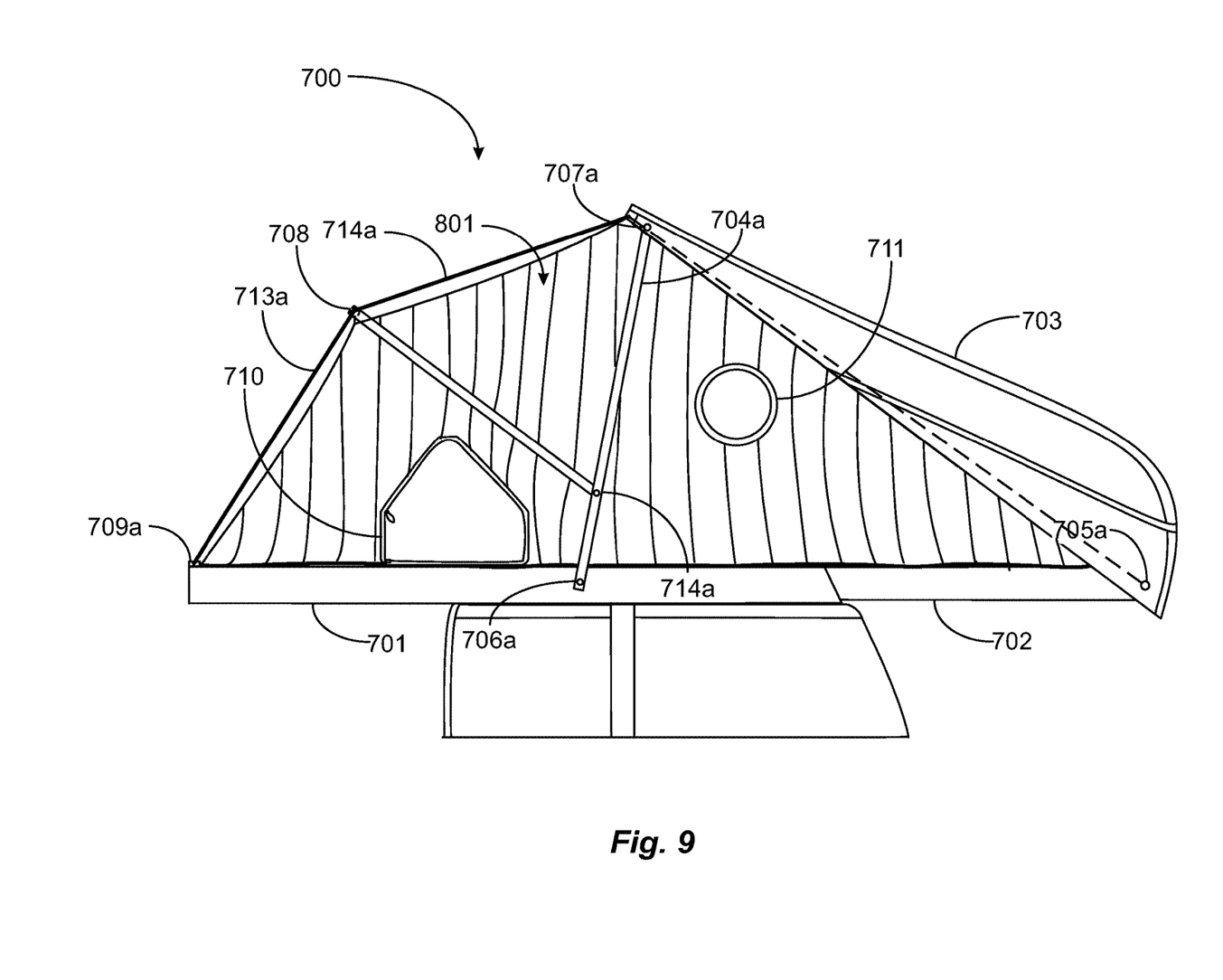
FIG. 9 is a side elevation view of the mechanized frame of FIG. 7 depicting attached tent fabric according to an embodiment of the invention.

FIG. 9 is a side elevation view of mechanized frame 700 of FIG. 7 depicting an attached fabric tent 801 suspended from the articulated portions of the frame structure according to an embodiment of the invention. Frame structure 700 is in a state of extension, and suspending tent 801 in this implementation. The tent may include strategically placed features such as hooks or snaps. In this implementation, the tent is confined to the inside of the articulated frame structure relative to the sides and ends of the structure. The lower portion, or floor of the tent may be connected to or attached onto a base or floor board that may fit just between the frame assemblies on both sides such as resting upon the cross members in between the linear assemblies.

The tent may feature such as a tent door 710 accessible by zipper and a tent window feature 711, but many embodiments may have no doors or windows, and entry and exit may be from below. Such a suspended tent may be fastened by snap, hook, or other methods and hardware to the inside of hard cover 703 on an inside surface at the edges and at the middle portion of the cover with respect to width of the cover. In one implementation, there may be an opening provided in the lower portion or floor of the tent that may be accessed from below the articulated frame structure without departing from the spirit and scope of the present invention. For example, a floorboard may have a trap door where a tent opening is strategically disposed above whereby one may make access into the tent from such as a bed of a pick up where the structure may be on a roof of the truck. In this implementation, the tent material remains within the footprint as the structure is relaxed unto a point where hard cover 703 may cover all the tent material and may be latched down with the tent material remaining inside and protected from the elements. One with skill in the art of pop-up tent structures will appreciate that there may be other ways to suspend a tent beneath structure 700 without departing from the spirit and scope of the invention.

Figure 10:
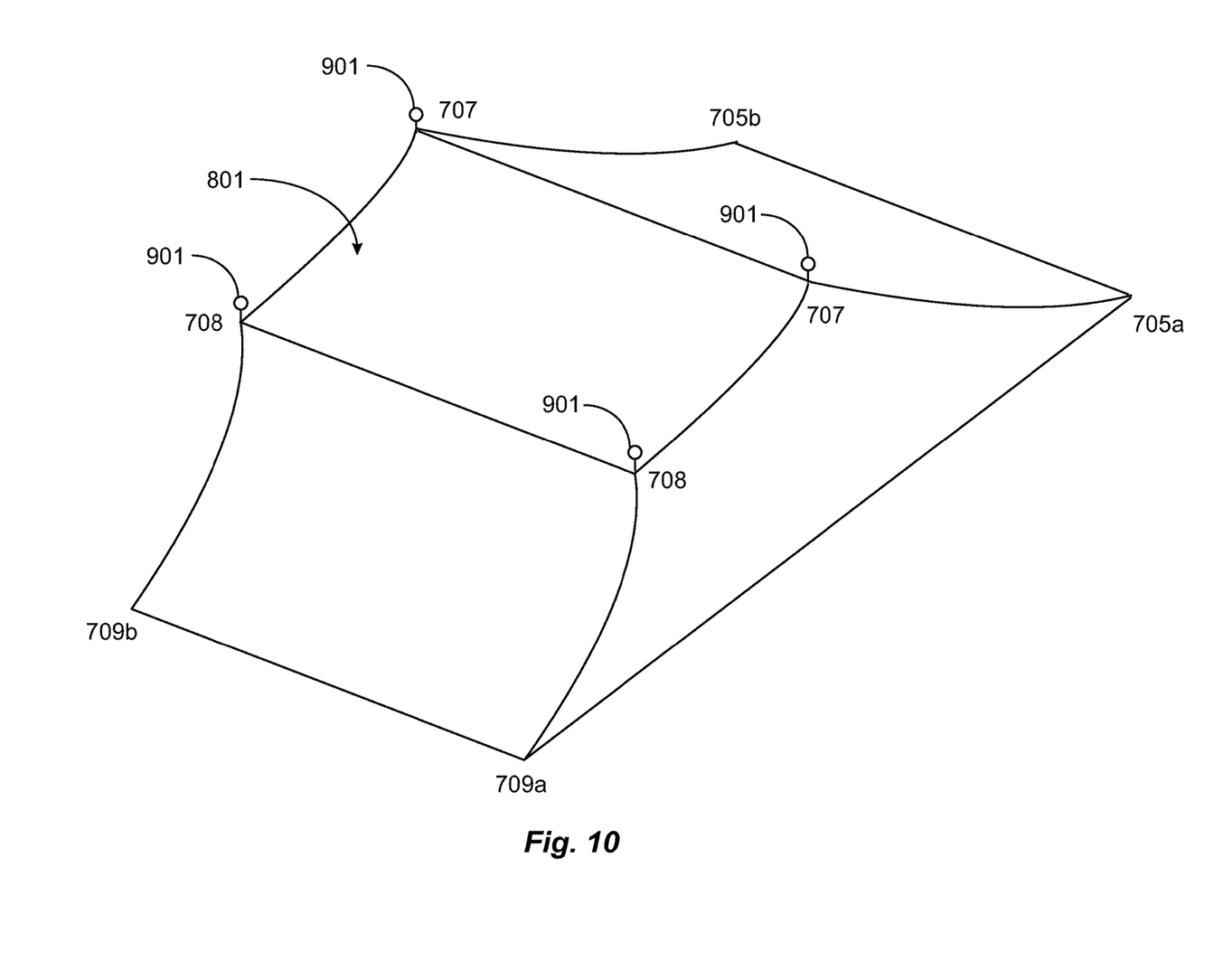
FIG. 10 is a perspective view of a personal enclosure of tent fabric that may be suspended from the mechanized frame structure of FIG. 7.

FIG. 10 is a perspective view of a tent structure 801 that may be suspended from the articulated framing structure 700 according to an embodiment of the present invention. The tent structure may be suspended by hook or fastener such as fasteners 901, which correspond to anchor points on frame structure 700, particularly on bar 708 and at the forward corners of the hard cover 703. In this implementation, there are four corner anchor points at bottom that the tent may be fastened to, more particularly, anchor points 705 on one end and anchor points 712 on the other end. In this implementation, the opening through the tent may be underneath the tent on the side of the tent or on the end of the tent opposite the hard cover.

One with skill in the art of mechanized frames will appreciate that overall frame structure 700 is not limited to a linear or rectangular footprint but that the lateral frame members may in fact not be linear members, but may also be arcuate members that may operate in much the same fashion as the integrated linear members, wherein the resulting articulated frame components create a suspension frame that may be oval, elliptical or annular without departing from the spirit and scope of the present invention.

It will be apparent to one with skill in the art that the retractable framing system of the invention capable of suspending and or supporting a fabric enclosure may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

The invention claimed is:

1. An articulated shelter, comprising:
 a static first frame structure, comprising a first and a second elongated frame element having a common first length, spaced apart at a width dimension by one or more structural elements constraining position of the first and second elongated frame elements, forming opposite sides of a rectangular region forming a first end and a second end, wherein the width is less than the first length;
 a translatable, rectangular second frame structure comprising third and fourth elongated frame elements having a common second length less than the first length, the third elongated frame elements constrained by bearing elements to translate in parallel and proximate, above, below, alongside, or within the first elongated frame element, and the fourth elongated frame element constrained by bearing elements to translate in parallel and proximate, above, below, alongside, or within the second elongated frame element, the third and fourth elongated frame elements joined by at least one cross member, the translatable second structure translatable in the direction of the common first length to extend from the second end of the static first structure and towards the first end from a minimum retracted dimension to a fixed, maximum extended dimension;
 a third rectangular frame structure comprising fifth and a sixth elongated frame elements spaced apart by at least one cross member to substantially the width dimension, the third rectangular frame structure having a third length greater than the first length, pivotally attached to be hinged at one end along the width dimension to an end of the translatable second frame structure away from the second end of the first structure, and
 a single rigid link having a fourth length, greater than half of the first common length, attached at one end at a pivot point along the length of the first elongated frame structure and at an opposite end pivotally at an end of the hinged third structure, away from the hinged end; and
 rigid or fabric panels joined along edges of the third frame structure;
 wherein, with the second frame structure fully retracted, the link lies substantially parallel to the first and second elongated frame structures, and the third rectangular frame structure lies above and substantially coplanar to the static first frame structure, and wherein, as the third frame structure is manually manipulated causing the second frame structure to extend and translate along the first frame structure to the maximum extend dimension, the third frame structure both translates with the second frame structure and is caused to rotate upward around the hinged end by rotation of the link about its pivot point on the first elongated frame structure, and wherein the link passes vertical, causing the third frame structure to rotate downward until the second frame structure reaches maximum extension, at which point the rigid or fabric panels form the articulated shelter, with weight of deployed elements keeping the structure deployed until the second frame element is urged to retract to the point that the link is vertical.

2. The articulated shelter of claim 1 wherein the panel joined along edges of the third frame structure is a rigid panel.

3. The articulated shelter of claim 2, further comprising a bar in a shape of the English letter U, pivoted at opposite ends at points on the first and second elongated frame elements, or at points on the link, the bar, in deployment, providing an additional shape to the deployed mechanical structure.

4. The articulated shelter of claim 3 further comprising a contiguous fabric structure having a rectangular base about the width of the first, second and third frame structures, and a length about the maximum extended length of the first and second frame structures, the fabric structure constrained within the mechanical structure, and suspended from points on the frame elements, such that the fabric structure is collapsed with the mechanical structure retracted, and deployed with the mechanical structure extended.

5. The articulated shelter of claim 3 further comprising a mechanical interface enabling mounting the articulated shelter, including the fabric structure, to a top of a cab of a vehicle.

6. The articulated shelter of claim 2 further comprising an interface enabling mounting of the mechanical structure, including the fabric structure, to a flat support.

7. The articulated shelter of claim 1 wherein the third rectangular frame structure is a rigid cover that covers and encloses all other elements of the mechanical structure in a retracted state.

8. The articulated shelter of claim 1 further comprising a second single rigid link mirroring the first link on an opposite side of the mechanical structure.

9. The articulated structure of claim 1, wherein the articulated shelter is mounted on a roof area of a moving vehicle including any one of a van cab surface, a truck cab surface, or a flatbed.

* * * * *